(12) United States Patent
Minami

(10) Patent No.: US 11,092,941 B2
(45) Date of Patent: Aug. 17, 2021

(54) PROGRAM CREATION DEVICE

(71) Applicant: FANUC CORPORATION, Yamanashi (JP)

(72) Inventor: Hiroshi Minami, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 243 days.

(21) Appl. No.: 16/366,233

(22) Filed: Mar. 27, 2019

(65) Prior Publication Data
US 2019/0302726 A1 Oct. 3, 2019

(30) Foreign Application Priority Data
Mar. 30, 2018 (JP) .............................. JP2018-067266

(51) Int. Cl.
| | | |
|---|---|---|
| *G05B 19/18* | (2006.01) | |
| *G05B 19/408* | (2006.01) | |
| *G05B 19/416* | (2006.01) | |
| *G05B 19/4093* | (2006.01) | |

(52) U.S. Cl.
CPC ......... *G05B 19/182* (2013.01); *G05B 19/408* (2013.01); *G05B 19/4083* (2013.01); *G05B 19/40937* (2013.01); *G05B 19/4163* (2013.01); *G05B 2219/45136* (2013.01)

(58) Field of Classification Search
CPC ................ G05B 19/182; G05B 19/408; G05B 19/4083; G05B 19/40937; G05B 19/4163
USPC .......................................................... 700/160
See application file for complete search history.

(56) References Cited

U.S. PATENT DOCUMENTS

| | | | | | |
|---|---|---|---|---|---|
| 4,631,684 | A | * | 12/1986 | Akasofu ............. | G05B 19/195 700/159 |
| 5,225,989 | A | * | 7/1993 | Kawamura ......... | G05B 19/4181 700/169 |

FOREIGN PATENT DOCUMENTS

| | | |
|---|---|---|
| JP | 59-33509 | 2/1984 |
| JP | 59-232745 | 12/1984 |
| JP | 63-184803 | 7/1988 |
| JP | 4-606 | 1/1992 |
| JP | H07-178645 A * | 7/1995 |
| JP | 2007-234002 | 9/2007 |
| WO | 2014/128916 | 8/2014 |

OTHER PUBLICATIONS

Notification of Reasons for Refusal dated Oct. 27, 2020 in Japanese Patent Application No. 2019-056608.

* cited by examiner

*Primary Examiner* — Mohammad Ali
*Assistant Examiner* — Joshua T Sanders
(74) *Attorney, Agent, or Firm* — Wenderoth, Lind & Ponack, L.L.P.

(57) ABSTRACT

A program creation device includes an analysis unit that analyzes a composite fixed cycle in which a predetermined cycle is repeated multiple times to create a plurality of command blocks CB1 to CB4 for each of the cycles for executing the cycle; a distribution unit that distributes the plurality of command blocks CB1 to CB4 created by the analysis unit sequentially as a command program for each of the plurality of tools; and a command adding unit that adds a first command word indicating a delay amount of delaying a start timing of the cycle of the second tool from a start timing of the cycle of the first tool on the basis of an analysis result obtained by the analysis unit to the command block CB2 or CB4.

2 Claims, 8 Drawing Sheets

CCY

N10 G71 U5.0 R2.0
N11 G71 P12 Q15 U3.0 W3.0 F0.1 S300 T5
N12 G00 M500
N13 G01U... F...
N14 U... W...
N15 U...
N16 G70 P12 Q15

PROGRAM CREATION DEVICE

This application is based on and claims the benefit of priority from Japanese Patent Application No. 2018-067266, filed on 30 Mar. 2018, the content of which is incorporated herein by reference.

BACKGROUND OF THE INVENTION

Field of the Invention

The present invention relates to a program creation device that creates programs for controlling machine tools.

Related Art

Conventionally, lathe processing in which cutting is performed by pressing a tool attached to a cutter holder against a work rotating in a state of being attached to a spindle is known (see Patent Documents 1 to 4, for example). In order to execute such lathe processing, a composite fixed cycle is used in which cycles of the respective steps of approaching, cutting, escaping, and returning are repeated multiple times.

However, when a tool is pressed against a work from one side, a deflection may occur in the work and it may be unable to process the work with high accuracy. In contrast, according to lathe processing called balance cut, since a pair of tools are pressed against the work from both sides, no deflection occurs in the work and it is possible to process the work with high accuracy.

Patent Document 1: Japanese Unexamined Patent Application, Publication No. H04-000606
Patent Document 2: Japanese Unexamined Patent Application, Publication No. S63-184803
Patent Document 3: PCT International Publication No. WO2014/128916
Patent Document 4: Japanese Unexamined Patent Application, Publication No. 2007-34002

SUMMARY OF THE INVENTION

The balance cut may use a first method in which a pair of tools performs cutting in synchronization and a second method in which one tool performs cutting and the other tool performs cutting while following the one tool and cutting deeper into a work. However, since the second method uses two systems that perform machining and move differently, it is not possible to use a composite fixed cycle.

The present invention has been made in view of the above-described problem, and an object thereof is to provide a program creation device that creates a program enabling balance cut in which one tool performs cutting and the other tool performs cutting while following the one tool and cutting deeper into a work to be executed using a composite fixed cycle.

(1) A program creation device (for example, a program creation device 1 to be described later) according to the present invention is a program creation device that creates a control program for a machine tool that performs balance cut in which one tool (for example, a tool CU1 to be described later) among a plurality of tools (for example, tools CU1 and CU2 to be described later) performs cutting and another tool (for example, a tool CU2 to be described later) performs cutting while following the one tool and cutting deeper into a rotating work (for example, a work W to be described later), the program creation device including: an analysis unit (for example, an analysis unit 21 to be described later) that analyzes a composite fixed cycle (for example, a composite fixed cycle CCY to be described later) in which a predetermined cycle (for example, a cycle CY to be described later) for causing the tool to perform cutting deeper into the work and feeding the tool is repeated multiple times to create a plurality of command blocks (for example, command blocks CB1 to CB4 to be described later) for each of the cycles for executing the cycle; a distribution unit (for example, a distribution unit 23 to be described later) that distributes the plurality of command blocks created by the analysis unit sequentially as a command program for each of the plurality of tools; and a command adding unit (for example, a command adding unit 22 to be described later) that adds a first command word indicating a delay amount of delaying a start timing of the cycle of the other tool from a start timing of the cycle of the one tool on the basis of an analysis result obtained by the analysis unit to the command block.

(2) In the program creation device according to (1), the command adding unit preferably adds a second command word that waits for the start timing of the cycle of the one tool and the start timing of the cycle of the other tool on the basis of the analysis result obtained by the analysis unit and then adds the first command word to the command block.

According to the present invention, it is possible to provide a program creation device that creates a program enabling balance cut in which one tool performs cutting and the other tool performs cutting while following the one tool and cutting deeper into a work to be executed using a composite fixed cycle.

DETAILED DESCRIPTION OF THE INVENTION

Hereinafter, an embodiment of the present invention will be described in detail with reference to the drawings.

First Embodiment

Figures 1, 2:
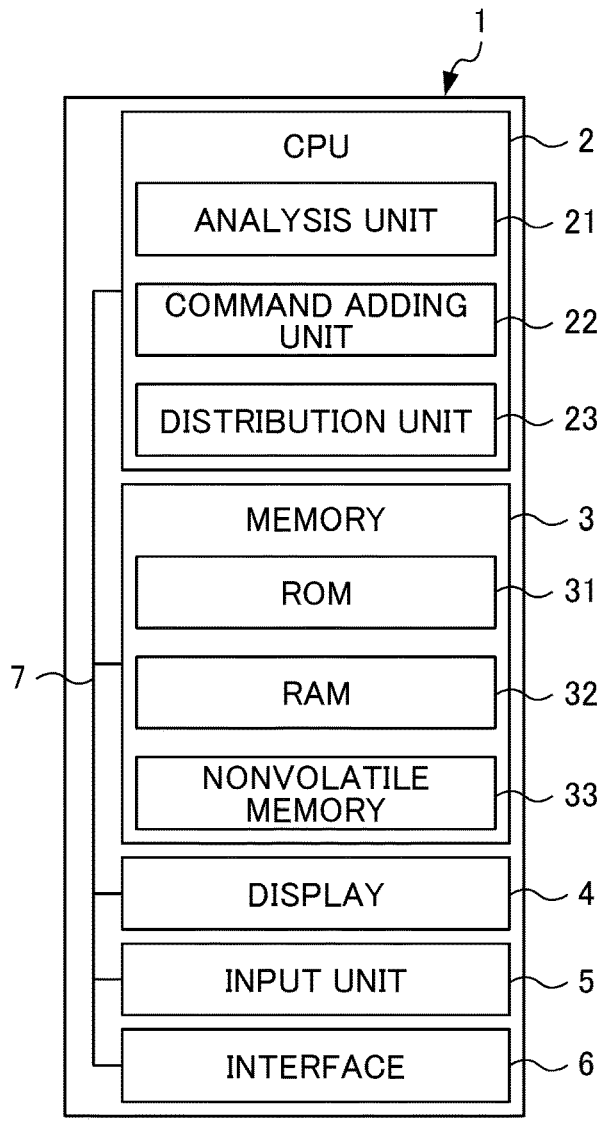
FIG. 1 is a functional block diagram illustrating a configuration of a program creation device according to a first embodiment.
FIG. 2 is a schematic diagram illustrating a composite fixed cycle analyzed by the program creation device according to the first embodiment.

First, a configuration of a program creation device 1 will be described with reference to FIG. 1. FIG. 1 is a functional block diagram illustrating a configuration of the program creation device 1 according to the first embodiment.

The program creation device 1 illustrated in FIG. 1 creates command programs P1 and P2 (see FIGS. 5 and 6) for controlling a machine tool that performs balance cut in which a first tool CU1 among a pair of tools CU1 and CU2 (see FIG. 7B) disposed at symmetrical positions with respect to a rotating work W (see FIGS. 8A and 8B) performs cutting and then the second tool CU2 performs cutting deeper into the work W while following the first tool CU1. The program creation device 1 may be incorporated integrally with a numerical controller that controls a machine tool and may be incorporated in a host controller or the like, which is separated from the numerical controller. Specifically, the program creation device 1 includes a CPU 2, a memory 3, a display 4, an input unit 5, an interface 6, and a bus 7.

The CPU 2 is a processor that controls the program creation device 1 in an integrated manner. The CPU 2 is connected to the memory 3, the display 4, the input unit 5, and the interface 6 via the bus 7. The memory 3 includes a ROM 31, a RAM 32, and a nonvolatile memory 33. The display 4 displays information necessary for an operator when creating the command programs P1 and P2 (see FIGS. 5 and 6). The input unit 5 is a keyboard or the like for inputting various commands and data. The interface 6 is connected to an external storage medium, a host computer, or the like to exchange various command and data.

The CPU 2 functions as an analysis unit 21, a distribution unit 23, and a command adding unit 22. The analysis unit 21 analyzes a composite fixed cycle CCY (see FIGS. 2 and 3A) in which a predetermined cycle CY (see FIG. 3B) is repeated multiple times to create a plurality of command blocks CB1 to CB4 (see FIG. 4) for respective cycles CY for executing the cycles CY. Respective commands are distributed by the distribution unit 23 to be described later so that the plurality of command blocks CB1 to CB4 are alternately distributed to the pair of tools CU1 and CU2.

The command adding unit 22 adds various command words to the command blocks CB1 to CB4. Hereinafter, adding of various command words will be described.

First, the command adding unit 22 adds a second command word that waits for a start timing of the cycle CY of the first tool CU1 and a start timing of the cycle CY of the second tool CU2 on the basis of an analysis result obtained by the analysis unit 21 to each of the command blocks CB1 to CB4. With the waiting for the start timings by the second command word, the start timing of the cycle of the first tool CU1 and the start timing of the cycle of the second tool CU2 are rearranged to the same timing, and after that, a delay amount resulting from adding of a first command word to be described later is set.

Figure 3A:
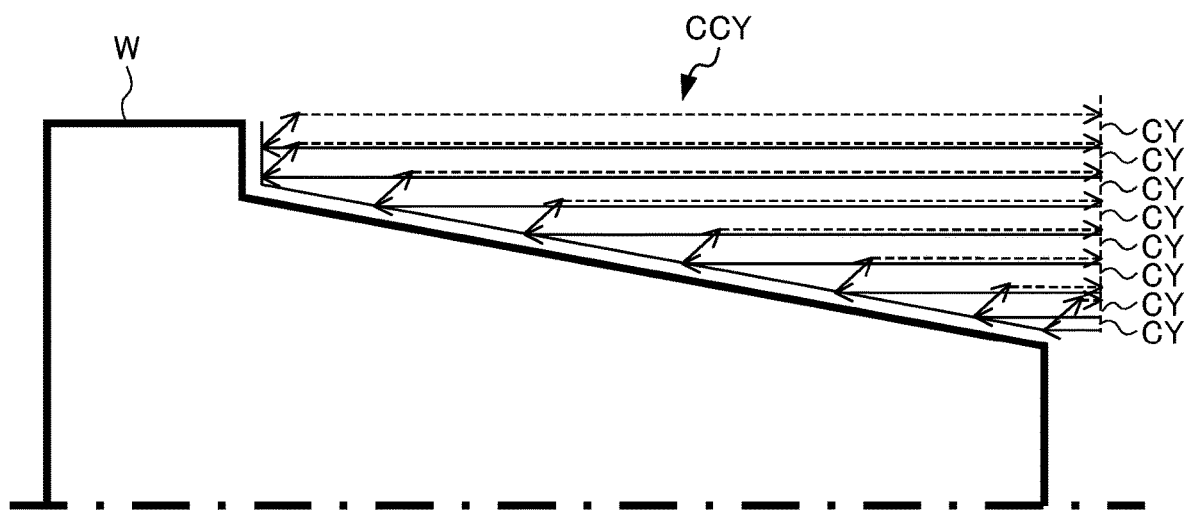
FIG. 3A is a schematic diagram illustrating moving paths of a composite fixed cycle.

Waiting for the start timings by the second command word is effective when the length of the cycle CY of the first tool CU1 is different from the length of the cycle CY of the second tool CU2. For example, when a machining shape of the rotating work W is a shape (for example, such a tapered shape as illustrated in FIG. 3A) in which a diameter changes gradually or stepwise in an axial direction, the cutting lengths of the respective cycles CY that form the composite fixed cycle CCY are different. Therefore, when the cycles are distributed, the lengths of the respective cycles performed alternately by the first and second tools CC1 and CU2 are different, and the periods required for the respective cutting steps are different from each other. As a result, the timing deviation occurs.

Figure 5:
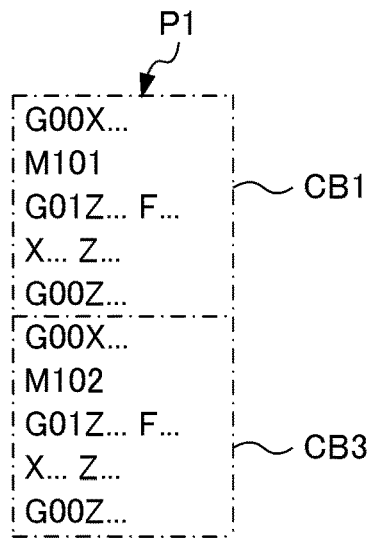
FIG. 5 is a schematic diagram illustrating a plurality of command blocks distributed as a command program for a first tool.
Figure 6:
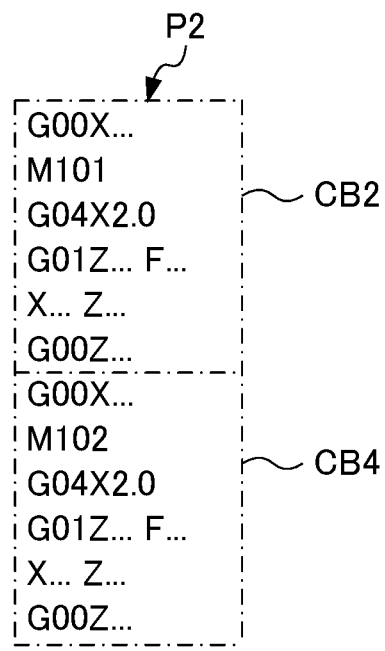
FIG. 6 is a schematic diagram illustrating a plurality of command blocks distributed as a command program for a second tool.

Specifically, waiting M codes are used as the second command word (see FIGS. 5 and 6). The M codes which are the second command words have the same numerical numbers between the command blocks (first and second systems) of the first and second tools CU1 and CU2 that wait for each other. In the next waiting, after the numerical numbers of the M codes are updated, the M codes of the updated numerical numbers are added to the command blocks (the first and second systems) of the first and second tools CU1 and CU2 that wait for each other. In this way, waiting can be realized.

The command adding unit 22 adds a first command word indicating a delay amount for delaying the start timing of the cycle CY of the second tool CU2 from the start timing of the cycle CY of the first tool CU1 to the command blocks (CB2, CB4, and the like in FIG. 6) distributed to the second tool CU2 on the basis of the analysis result obtained by the analysis unit 21. As described above, after the start timings are rearranged by the waiting of the start timings, the first command word indicating the delay amount is added to the command block of the second tool CU2 which is the delaying-side system (that is, the second system in the present embodiment). In this case, even when there is a difference in the moving time of the first and second tools CU1 and CU2 moving to the machining start point, balance cut processing can be executed with the set delay amount.

Here, a delay amount of half the rotation of a spindle is set as the delay amount. In the present embodiment, since the pair of tools CU1 and CU2 are disposed at symmetrical positions with respect to the work W so as to sandwich the rotating work W, if the delay amount is smaller than half the rotation of the spindle, a portion which has not been cut by the first tool CU1 may be cut abruptly by the second tool CU2, the cutting depth may become too large, and the cutting volume may become excessively large. For example, a delay amount of one or two rotations of the spindle is set as the delay amount.

Specifically, a dwell command G04 is used as the first command word (see FIGS. 5 and 6). For example, G04X2.0 as the dwell command is added to the command block of the second tool CU2 which is the delaying-side system (that is, the second system in the present embodiment). The same delay amount is added to the command block of the second tool CU2. In this way, the second tool CU2 performs cutting with the same delay amount as the first tool CU1 in respective cycles.

Figure 7A:
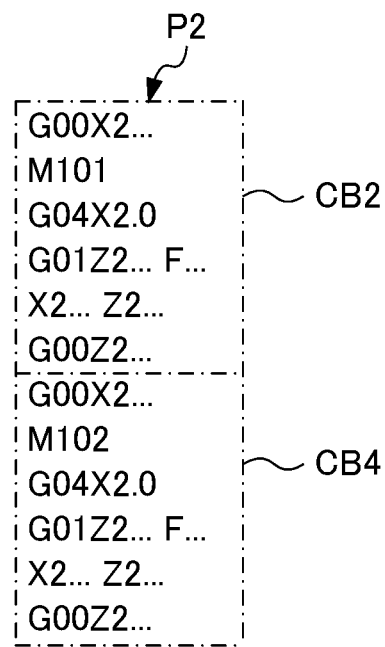
FIG. 7A is a schematic diagram illustrating the command program for the second tool in which, for convenience, 2 is attached to the names of axes in a second system.

FIG. 7A is a schematic diagram illustrating the command program for the second tool in which, for convenience, 2 is attached to the names of axes in a second system. As shown in FIG. 7A, in a system in which a command of a composite fixed cycle is not present, that is, in the second system of the present embodiment, a predetermined relation (an offset amount between the origins of the machines, see FIG. 7B) between the coordinate systems of both systems of the pair of tools CU1 and CU2 is used so as to convert to a command value in the coordinate system of the subject system.

Figure 3B:
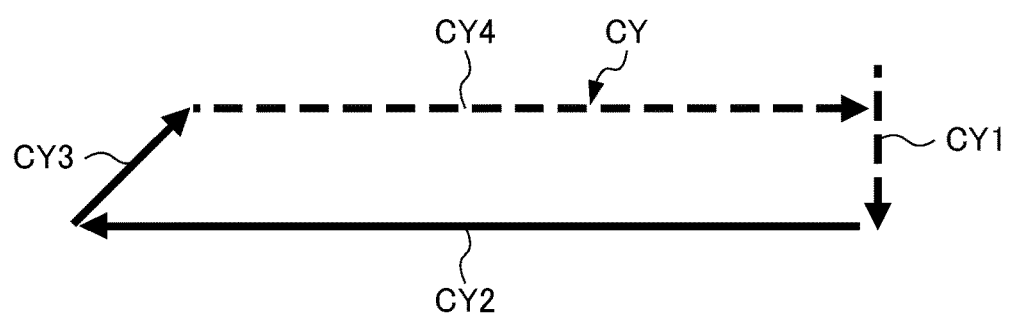
FIG. 3B is a schematic diagram illustrating moving paths of cycles that form the composite fixed cycle.
Figure 4:
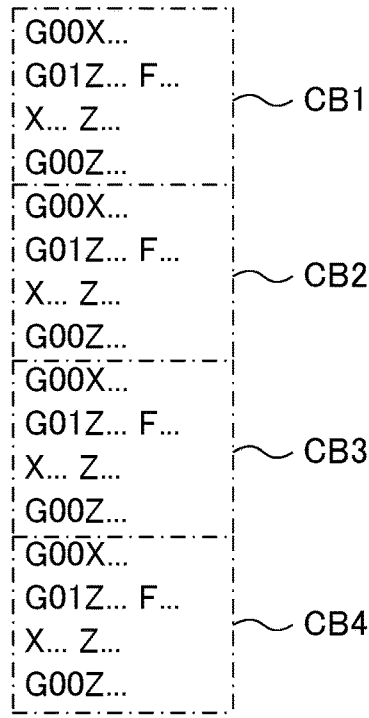
FIG. 4 is a schematic diagram illustrating a command block created by analyzing the composite fixed cycle.

The command adding unit 22 adds a command word for doubling the amount of an approach CY1 (see FIG. 3B) to command blocks (CB2, CB3, CB4, and the like in FIG. 4)

other than the first command block (CB1 in FIG. 4). In the present embodiment, since balance cut is performed using two tools CU1 and CU2, the respective cycles of the composite fixed cycle CCY are alternatively distributed as command programs for the respective tools and the amount of the approach CY1 is doubled.

The distribution unit 23 distributes the plurality of command blocks (CB1 to CB4 in FIG. 4) which is created by the analysis unit 21 and to which commands are added by the command adding unit 22 alternately as the command programs P1 and P2 (see FIGS. 5 and 6) for the pair of tools CU1 and CU2. In the present embodiment, since balance cut is performed using the pair of tools CU1 and CU2, the plurality of command blocks which is created by the analysis unit 21 and to which commands are added by the command adding unit 22 are alternately distributed. However, when balance cut is performed using three or more tools, the plurality of command blocks to which commands are added by the command adding unit 22 are sequentially distributed in the order of steps.

Next, the composite fixed cycle CCY analyzed by the program creation device 1 will be described with reference to FIGS. 2, 3A, and 3B. FIG. 2 is a schematic diagram illustrating the composite fixed cycle CCY analyzed by the program creation device 1. FIG. 3A is a schematic diagram illustrating a moving path of the composite fixed cycle CCY. FIG. 3B is a schematic diagram illustrating the moving paths of cycles CY that form the composite fixed cycle CCY.

In FIG. 3A, one side in relation to a rotation axis of the rotating work W is illustrated for the sake of convenience (the same is true to FIGS. 8A and 8B to be described later). As illustrated in these drawings, in the present embodiment, the rotating work W is subjected to lathe processing to obtain a tapered shape in which the diameter thereof changes gradually in a rotation axis direction.

The composite fixed cycle CCY illustrated in FIG. 2 is a program for performing lathe processing for cutting the work W (see FIG. 3A) by feeding one tool while pressing the tool against the rotating work W. As illustrated in FIG. 3A, the composite fixed cycle CCY repeats a predetermined cycle CY multiple times.

As illustrated in FIG. 3B, the composite fixed cycle CCY includes an approach CY1 to the work W, a cutting CY2 of the work W, an escape CY3 from the work W, and a return CY4 to an initial position. The approach CY1 and the return CY4 are executed by rapid feed (see a broken-line arrow). The cutting CY2 and the escape CY3 are executed by cutting feed (see a solid-line arrow).

Figure 7B:
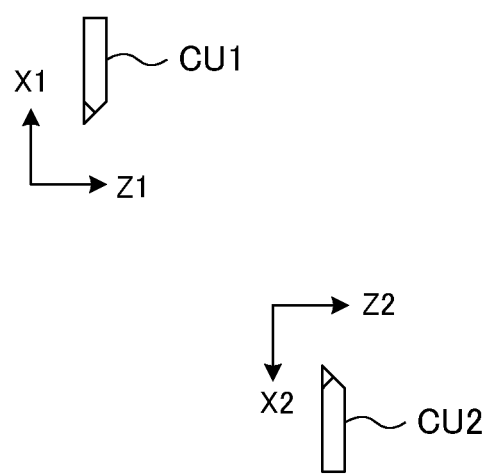
FIG. 7B is a schematic diagram illustrating the coordinate systems of the first and second tools.

Next, a machine tool control program created by the program creation device 1 will be described with reference to FIGS. 4, 5, 6, 7A, and 7B. FIG. 4 is a schematic diagram illustrating the command blocks CB1 to CB4 created by analyzing the composite fixed cycle CCY. FIG. 5 is a schematic diagram illustrating a plurality of command blocks CB1 and CB3 distributed as the command program P1 for the first tool CU1. FIG. 6 is a schematic diagram illustrating a plurality of command blocks CB2 and CB4 distributed as the command program P2 for the second tool CU2. FIG. 7A is a schematic diagram illustrating the command program P2 for the second tool CU2 after the coordinate system is converted. FIG. 7B is a schematic diagram illustrating the coordinate systems of the first and second tools CU1 and CU2.

When the analysis unit 21 analyzes the composite fixed cycle CCY, the plurality of command blocks CB1 to CB4 and the like are created as illustrated in FIG. 4. The plurality of command blocks CB1 to CB4 are alternatively distributed as the command program P1 for the first tool CU1 or the command program P2 for the second tool CU2 after various command words are added thereto by the command adding unit 22.

As illustrated in FIG. 5, the command program P1 for the first tool CU1 include a plurality of command blocks CB1 and CB3 and the like. It is understood that M101 which is a waiting M code is added to the command block CB1 and M102 which is a waiting M code is added to the command block CB3.

As illustrated in FIG. 6, the command program P2 for the second tool CU2 includes a plurality of command blocks CB2 and CB4 and the like. It is understood that M101 which is a waiting M code and a dwell command of G04X2.0 are added to the command block CB2 and M102 which is a waiting M code and a dwell command of G04X2.0 are added to the command block CB4.

As shown in FIG. 7A, in the system in which the command of the composite fixed cycle is not present, that is, in the second system of the present embodiment, the predetermined relation (the offset amount between the origins of the machines, see FIG. 7B) between the coordinate systems of both systems of the pair of tools CU1 and CU2 is used so as to convert to the command value in the coordinate system of the subject system.

Next, the moving paths of the tools CU1 and CU2 will be described with reference to FIGS. 8A and 8B. FIG. 8A is a schematic diagram illustrating a moving path of the first tool CU1 by the command program P1. FIG. 8B is a schematic diagram illustrating a moving path of the second tool CU2 by the command program P2.

Figure 8A:
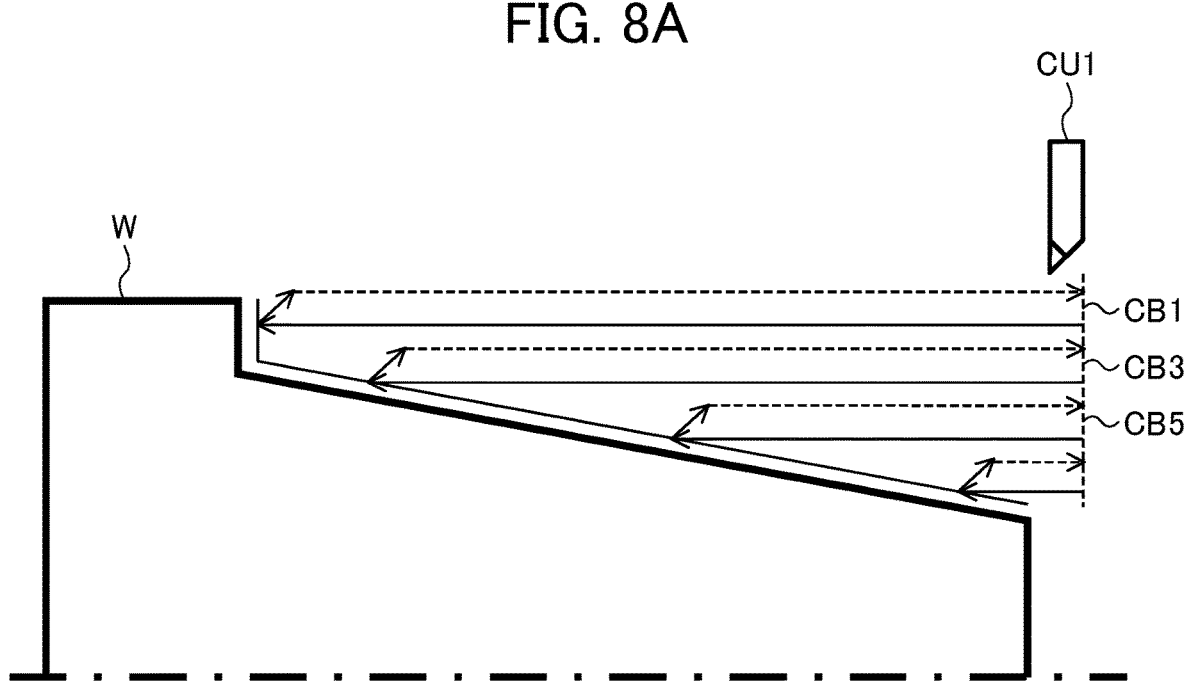
FIG. 8A is a schematic diagram illustrating a moving path of the first tool according to the command program.
Figure 8B:
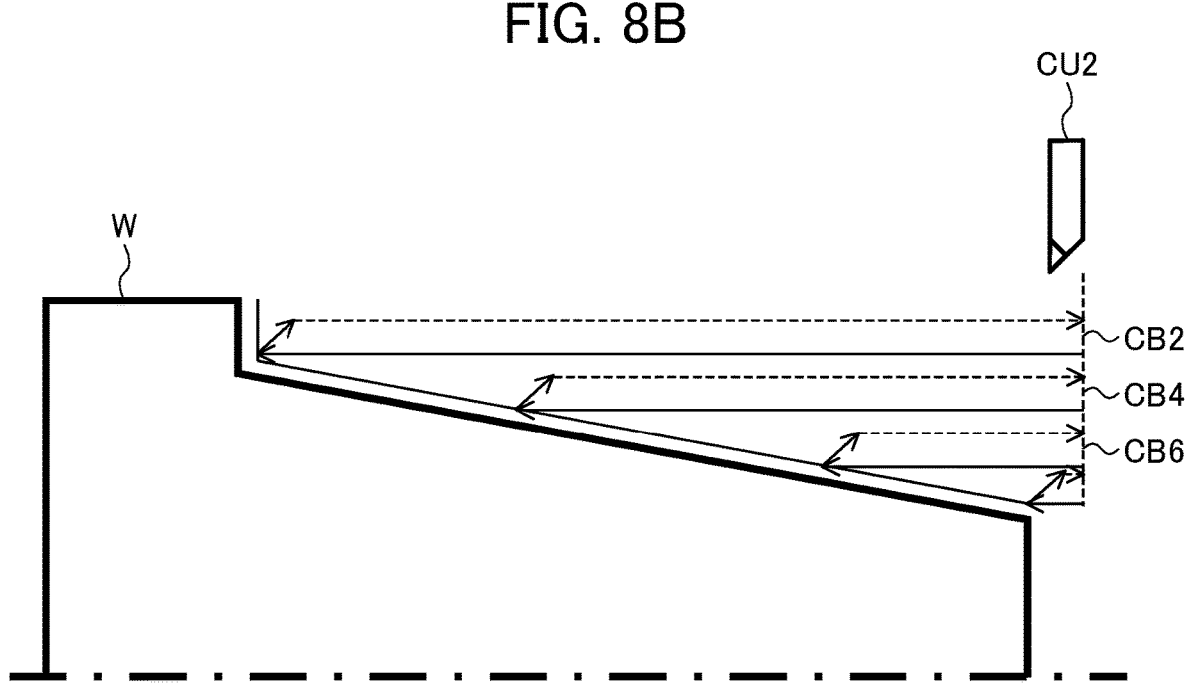
FIG. 8B is a schematic diagram illustrating a moving path of the second tool according to the command program.

As illustrated in FIG. 8A, it is understood that the first tool CU1 moves along a moving path corresponding the command blocks CB1, CB3, CB5, and the like. The second tool CU2 moves along a moving path corresponding to the command blocks CB2, CB4, CB6, and the like.

Figure 9:
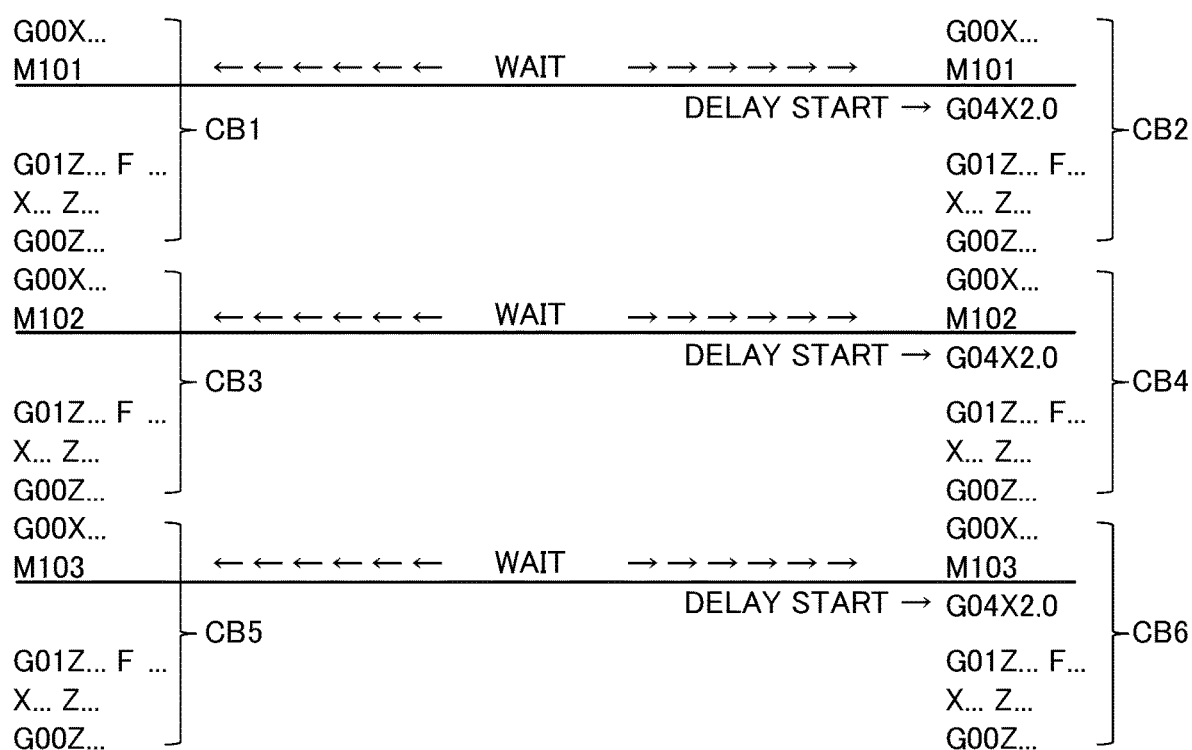
FIG. 9 is a diagram illustrating a command program for the first tool and the command program for the second tool.

The relation between the command blocks CB1, CB3, and CB5 of the first tool CU1 which is the first system and the command blocks CB2, CB4, and CB6 of the second tool CU2 which is the second system will be described. FIG. 9 is a diagram illustrating a command program for the first tool and a command program for the second tool.

As illustrated in FIG. 9, the same waiting M code M101 is added to the command block CB1 of the first system (the first tool CU1) and the command block CB2 of the second system (the second tool CU2) and waiting is performed. A dwell command G04X2.0 indicating a delay amount is added to the command block CB2 of the second system (the second tool CU2) immediately after a waiting M code command, and the second system performs machining with the delay amount set from the first system.

Similarly, the same waiting M code M102 is added to the command block CB3 of the first system (the first tool CU1) and the command block CB4 of the second system (the second tool CU2), and waiting is performed. A dwell command G04X2.0 indicating a delay amount is added to the command block CB4 of the second system (the second tool CU2) immediately after a waiting M code command, and the second system performs machining with the delay amount set from the first system.

The same relation is applied to the command blocks CB5 and CB6, and delayed machining after waiting can be executed between both systems.

Figure 10:
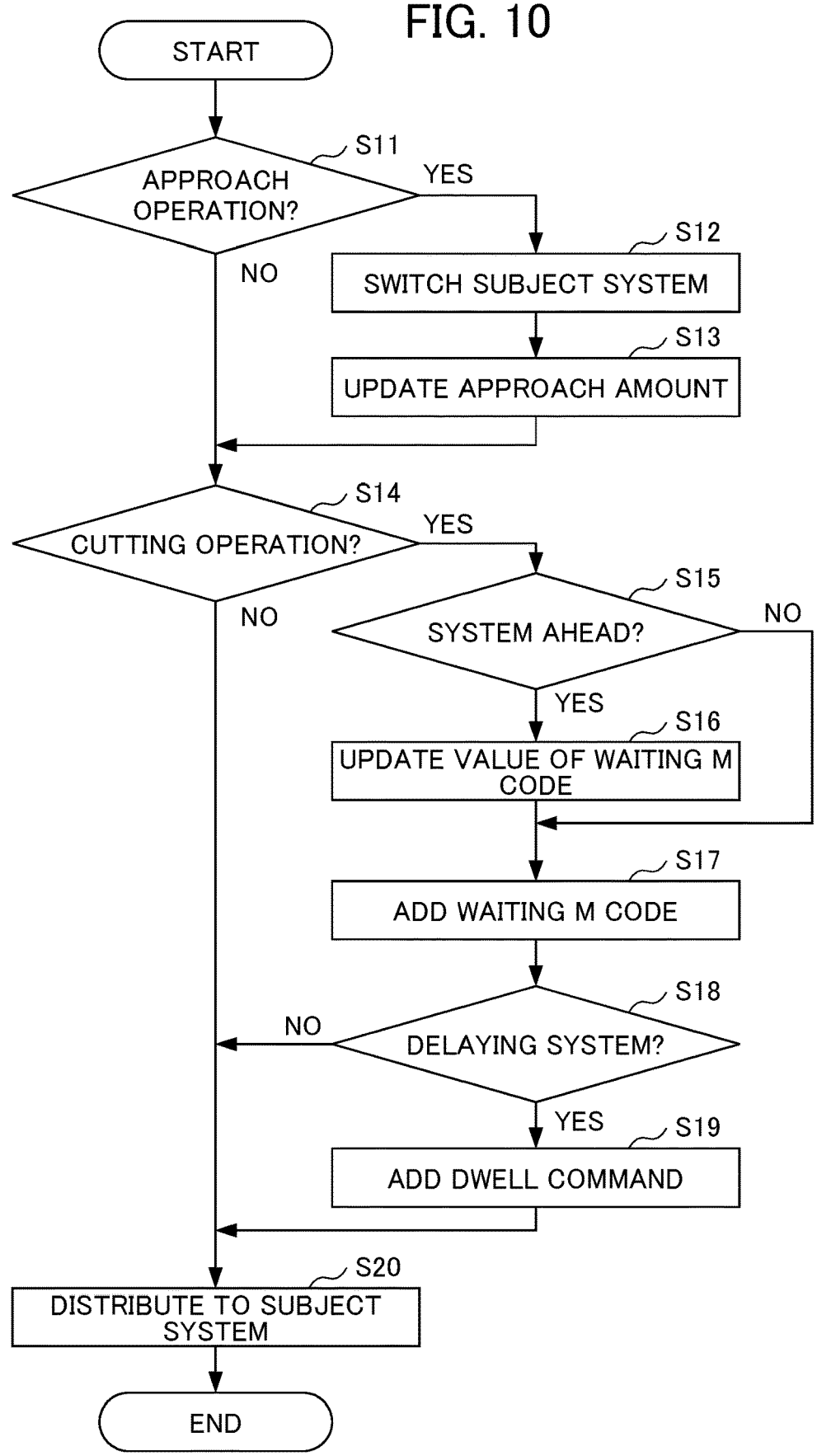
FIG. 10 is a flowchart illustrating the flow in which the program creation device distributes a plurality of command blocks.

Next, a flow in which the program creation device 1 distributes the plurality of command blocks CB1 to CB4 and the like will be described with reference to FIG. 10. FIG. 10 is a flowchart illustrating the flow in which the program creation device 1 distributes the plurality of command blocks CB1 to CB4 and the like.

The distribution unit 23 distributes the plurality of command blocks CB1 to CB4 and the like created by the analysis unit 21, to which an M code command indicating waiting and a dwell command indicating a delay amount are added by the command adding unit 22, alternately to the two systems of the first and second tools CU1 and CU2.

Specifically, as illustrated in FIG. 10, first, in step S11, it is determined whether it is an operation of an approach CY1 (see FIG. 3B). When a determination result is YES, the flow proceeds to step S12, and a subject system is switched alternately. That is, switching to the next cutting step is performed.

After that, the flow proceeds to step S13, and the amount of the approach CY1 (see FIG. 3B) is updated. In the present embodiment, as described above, the approach amount is set to two times. After the approach amount is updated, the flow proceeds to step S14 to be described later.

When a determination result in step S11 is NO, the flow proceeds to step S14 and it is determined whether it is an operation of the cutting CY2 (see FIG. 3B). When a determination result is NO, the flow proceeds to step S20 whereas when a determination result is YES, the flow proceeds to step S15, and whether or not the command block is of a system ahead is determined. When a determination result is YES, the value of the waiting M code that waits for a start timing of the cycle CY of the first tool CU1 and the start timing of the cycle CY of the second tool CU2 is updated. After that, the flow proceeds to step S17 to be described later, and a waiting code is added to the command block. When a determination result in step S15 is NO, the flow proceeds to step S17 and the waiting code is added to the command block.

Specifically, as described above, when the machining shape of the rotating work W is a shape (for example, such a tapered shape as illustrated in FIG. 3A) in which a diameter changes gradually or stepwise in an axial direction, the cutting lengths of the respective cycles CY that form the composite fixed cycle CCY are different and the periods required for the respective cutting steps become different. As a result, the timing deviation occurs. Therefore, the start timing of the next cycle CY of the first tool CU1 and the start timing of the next cycle CY of the second tool CU2 are waited for so that the deviation of the start timing can be eliminated.

Subsequently, in step S18, it is determined whether a command block is of the delaying-side system. When a determination result is YES, since the command block is of the delaying-side system, the flow proceeds to step 19, a dwell command is added to the command block and the flow proceeds to step S20. When a determination result is NO, since the command block is not of the delaying-side system, the flow proceeds to step S20 without adding a dwell command to the command block.

In step S20, the command blocks CB1 to CB4 and the like to which the waiting command and the dwell command are added as described above are distributed to the respective subject systems, and the present process ends. Specifically, since the pair of tools CU1 and CU2 is used in the present embodiment, the command blocks CB1 to CB4 are alternately distributed to the first and second tools CU1 and CU2.

In the present embodiment, a command for performing balance cut may be added to a command format of the composite fixed cycle CCY (see FIGS. 2 and 3A). Specifically, a dedicated G code indicating a composite fixed cycle to which balance cut is included may be used. That is, "G710" may be set instead of "G71" in the composite fixed cycle CCY illustrated in FIG. 2 as the dedicated G code. Alternatively, a command word indicating a counterpart system may be added. That is, "P2" meaning System 2 may be added immediately after "G71U5.0R2.0" to create "G71U5.0R2.0P2", for example.

"B2.0" meaning delaying the spindle by two rotations may be added immediately after "G71U5.0R2.0", for example, as a command word (a first command word) indicating a delay amount between systems that perform balance cut to create "G71U5.0R2.0B2.0".

As described above, according to the program creation device 1 according to the present embodiment, it is possible to create the program P1 and P2 for executing balance cut in which one tool CU1 or CU2 performs cutting and the other tool CU2 or CU1 performs cutting while following the one tool and cutting deeper into a work using a composite fixed cycle.

Second Embodiment

A program creation device according to the second embodiment has a similar configuration to the program creation device 1 according to the first embodiment except that the command adding unit has a different configuration from that of the first embodiment. Specifically, the program creation device according to the present embodiment is different from that of the first embodiment in that the command adding unit adds a dwell command indicating a delay amount without adding a waiting M code as the second command word.

The program creation device according to the present embodiment is effective when a machining shape is a shape such as a cylindrical shape in which the diameter does not change in an axial direction. That is, in this case, since the cutting lengths of the respective cycles CY that form the composite fixed cycle CCY are equal, when these cycles are distributed, the lengths of the cycles performed alternately by the first and second tools CC1 and CU2 are equal, and the periods required for the respective cutting steps are equal. As a result, a timing deviation does not occur. Therefore, when an initial delay amount is set, since no deviation occurs, it is not necessary to wait.

While the embodiments of the present invention have been described, the present invention is not limited to the above-described embodiments. The advantageous effects described in the embodiments of the present invention are only exemplary ones of most preferable effects produced by the present invention, and the advantageous effects of the present invention are therefore not limited to those described in the above embodiments of the present invention.

As described above, according to the program creation device according to the present embodiment, it is possible to create the program P1 and P2 for executing balance cut in which one tool CU1 or CU2 performs cutting and the other tool CU2 or CU1 performs cutting while following the one tool and cutting deeper into a work using a composite fixed cycle depending on a machining shape.

In the above-described embodiments, although a case in which the first and second tools CU1 and CU2 are disposed at symmetrical positions with respect to the work W to perform balance cut has been described as an example, the present invention is not limited thereto. The present invention can be applied to a case of performing balance cut using three or more tools. In this case, it is preferable to arrange a plurality of tools at equal intervals in a circumferential direction and a delay amount and a waiting amount are set appropriately on the basis of an arrangement of the tools and a shape of the work W.

EXPLANATION OF REFERENCE NUMERALS

1: Program creation device
2: CPU
21: Analysis unit
22: Command adding unit
23: Distribution unit
3: Memory
31: ROM
32: RAM
33: Nonvolatile memory
4: Display
5: Input unit
6: Interface
W: Work
CU1: First tool
CU2: Second tool
P1: First command program
P2: Second command program
CCY: Composite fixed cycle
CY: Cycle
CB1, CB2, CB3, CB4: Command block

What is claimed is:

1. A program creation device that creates a control program for a machine tool that performs balance cut in which a first tool among a plurality of tools performs cutting into a rotating work and a second tool performs cutting while following the first tool and cutting deeper into the rotating work than does the first tool, the program creation device comprising:
a processor configured to
analyze a composite fixed cycle in which a predetermined cycle for causing a tool to perform cutting into a work and feeding the tool is repeated multiple times, and then create a plurality of command blocks for each of the cycles for executing the cycle based on the composite fixed cycle;
distribute command blocks of the plurality of command blocks created sequentially as a command program for each of the plurality of tools; and
add a first command word indicating a delay amount of delaying a start timing of the cycle of the second tool from a start timing of the cycle of the first tool on the basis of an analysis result obtained to a command block of a command program for one of the plurality of tools.

2. The program creation device according to claim 1, wherein
the processor is further configured to add a second command word that waits for the start timing of the cycle of the first tool and the start timing of the cycle of the second tool on the basis of the analysis result obtained and then add the first command word to the command block of the command program for one of the plurality of tools.

* * * * *